(12) United States Patent
Tang

(10) Patent No.: US 11,108,976 B2
(45) Date of Patent: Aug. 31, 2021

(54) HANDHELD INFRARED IMAGER

(71) Applicant: Hangzhou Hikmicro Sensing Technology Co., Ltd., Zhejiang (CN)

(72) Inventor: Jun Tang, Zhejiang (CN)

(73) Assignee: Hangzhou Hikmicro Sensing Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/756,722

(22) PCT Filed: Sep. 5, 2018

(86) PCT No.: PCT/CN2018/104111
§ 371 (c)(1),
(2) Date: Apr. 16, 2020

(87) PCT Pub. No.: WO2019/085638
PCT Pub. Date: May 9, 2019

(65) Prior Publication Data
US 2020/0267335 A1  Aug. 20, 2020

(30) Foreign Application Priority Data

Oct. 30, 2017 (CN) .......................... 201721417322.1
Dec. 8, 2017 (CN) .......................... 201721704316.4
Jan. 2, 2018 (CN) .......................... 201820003456.7

(51) Int. Cl.
*H04N 5/33* (2006.01)
*G01J 5/02* (2006.01)
*G01J 5/00* (2006.01)

(52) U.S. Cl.
CPC .............. *H04N 5/33* (2013.01); *G01J 5/0265* (2013.01); *G01J 2005/0077* (2013.01)

(58) Field of Classification Search
None
See application file for complete search history.

(56) References Cited

U.S. PATENT DOCUMENTS 9,638,886 B1  5/2017 Weidner et al.
2009/0257469 A1* 10/2009 Jones .................... G01J 5/0265
374/133

(Continued)

FOREIGN PATENT DOCUMENTS

CN  201193961 Y   2/2009
CN  204809084     11/2015

(Continued)

*Primary Examiner* — Christopher Braniff
(74) *Attorney, Agent, or Firm* — Bret E. Field; Bozicevic, Field & Francis LLP

(57) ABSTRACT

An embodiment of this application discloses a handheld infrared imager that includes a cell and a batter cover. The cell is provided with a circumferential positioning hole, a circumferential positioning protrusion is correspondingly provided at an end of the battery cover, and the circumferential positioning protrusion and the circumferential positioning hole are engaged with each other to implement relative circumferential positioning. A longitudinal positioning protrusion is provided on an outer peripheral side wall of the cell, a longitudinal positioning groove is correspondingly provided on a sidewall of the battery cover, and the longitudinal positioning protrusion and the longitudinal positioning groove are engaged with each other to implement relative longitudinal positioning. In embodiments of the present application, in the assembly of the cell and the battery cover, a positioning method with the fixed buckling of the sidewalls of the cell and protrusion-groove engagement of the bottom of the cell is used, so that the assembly is extremely simple.

20 Claims, 13 Drawing Sheets

(56) References Cited

U.S. PATENT DOCUMENTS

| | | | |
|---|---|---|---|
| 2012/0281296 A1 | 11/2012 | Ozawa et al. | |
| 2014/0036068 A1 | 2/2014 | Nguyen et al. | |
| 2014/0267879 A1* | 9/2014 | Loukusa | G03B 17/18 348/345 |

FOREIGN PATENT DOCUMENTS

| | | |
|---|---|---|
| CN | 105799328 A | 7/2016 |
| CN | 106671032 A | 5/2017 |
| CN | 207439552 U | 6/2018 |
| CN | 207458823 U | 6/2018 |
| CN | 207834374 U | 9/2018 |
| EP | 2278288 A2 | 1/2011 |
| JP | H01318468 A | 12/1989 |
| KR | 10-1001602 B1 | 12/2010 |
| WO | WO2012027739 A2 | 3/2012 |

\* cited by examiner

HANDHELD INFRARED IMAGER

The present application claims the priorities to a Chinese Application No. 201721417322.1, filed with the China National Intellectual Property Administration on Oct. 30, 2017 and entitled "Trigger Button Assembly and Thermal Imaging Device Having the Same", and a Chinese Application No. 201721704316.4, filed with the China National Intellectual Property Administration on Dec. 8, 2017 and entitled "Handheld Infrared Imager", and a Chinese Application No. 201820003456.7, filed with the China National Intellectual Property Administration on Jan. 2, 2018 and entitled "Battery Module and Handheld Infrared Imager Having the Same", which are incorporated herein by reference in their entirety.

TECHNICAL FIELD

The present application relates to the technical field of a handheld device, and in particular to a handheld infrared imager.

BACKGROUND

For a product such as a handheld infrared imager, a cell is generally assembled with a battery cover and a buckle by means of screws or ultrasonic welding. The process is relatively complicated and the operation is complicated. In addition, it is necessary to develop a special mold for the ultrasonic welding, and for screw connection, spaces for screwing must be reserved in the structural space, which is not conducive to miniaturization and compactness of the overall structure.

Therefore, it is desirable to provide a technical solution to overcome or at least mitigate at least one of the above-mentioned defects in the related art.

SUMMARY

An object of embodiments of the present application is to provide a handheld infrared imager to overcome or at least mitigate at least one of the above-mentioned defects in the related art. The specific technical solution is as follows:

An embodiment of the present application provides a battery module, and in particular, a battery module for a handheld device such as a handheld infrared imager to simplify the assembly process of a battery (a cell) and a battery cover, and reduce related development costs.

An embodiment of the present application provides a handheld infrared imager. The handheld infrared imager includes a battery module, and the battery module includes a cell and a battery cover. A circumferential positioning hole or a circumferential positioning protrusion is provided at an end of the cell (1) adjacent to the battery cover, a circumferential positioning protrusion or a circumferential positioning hole is correspondingly provided at a bottom of the battery cover, and the circumferential positioning protrusion and the circumferential positioning hole are engaged with each other to achieve relative circumferential positioning between the cell and the battery cover; and a longitudinal positioning protrusion or a longitudinal positioning groove is provided on an outer peripheral sidewall of the cell, a longitudinal positioning groove or a longitudinal positioning protrusion is correspondingly provided on a sidewall of the battery cover, and the longitudinal positioning protrusion and the longitudinal positioning groove are engaged with each other to achieve relative longitudinal positioning between the cell and the battery cover.

Optionally, two circumferential positioning holes are provided on the cell, each of the circumferential positioning holes is of a cylindrical shape or a conical shape and the circumferential positioning protrusion is of a cylindrical shape or a cone frustum shape.

Optionally, the sidewall of the battery cover includes an outer peripheral sidewall and an additional sidewall provided inside and spaced from the outer peripheral sidewall; the additional sidewall extends upward from the bottom of the battery cover, and the additional sidewall has a thickness smaller than a thickness of the outer peripheral sidewall; the longitudinal positioning groove is provided in the additional sidewall and penetrates the additional sidewall.

Optionally, two longitudinal positioning protrusions are provided on the cell, and the two longitudinal positioning protrusions are provided facing away from each other; the additional sidewall extends along a partial circumference thereof and includes a first additional sub-sidewall and a second additional sub-sidewall; the longitudinal positioning groove is provided in a middle along a circumferential direction of each of the first additional sub-sidewall and the second additional sub-sidewall.

Optionally, the battery module further includes a battery buckle and an elastic sheet; one end of the battery buckle is provided with a barb that is cooperatively connected to a main body of a handheld device, the battery buckle is provided with a rotating shaft at a portion thereof away from the barb, and the rotating shaft is rotatably engaged with the battery cover to allow the battery buckle to swing around the rotating shaft; one end of the elastic sheet is inserted and mounted into the battery cover, and the other end of the elastic sheet abuts against the battery buckle and applies an outward elastic force on the battery buckle.

Optionally, two battery buckles and two elastic sheets are provided, with one set of a battery buckle and an elastic sheet and the other set of a battery buckle and an elastic sheet provided facing away from each other.

Optionally, the longitudinal positioning protrusions provided on the cell and the battery buckle are staggered from each other in a circumferential direction.

Optionally, the rotating shaft of the battery buckle has a semicircular cross-section or an inferior arc cross-section, an arc-shaped straight groove is provided in the battery cover, and the rotating shaft is rotatably engaged inside the arc-shaped straight groove.

Optionally, the battery cover is a two-color injection-molded part, which has a surface layer made of a soft rubber material and an inner layer made of hard plastic; the soft rubber of the surface layer of the battery cover is provided with a protruding thin rib at an end surface abutting against the main body of the device, and the thin rib protrudes with a height less than or equal to 2 mm.

Optionally, the battery module further includes a cover plate. The cover plate is fixedly connected to the battery cover by a screw, and the cover plate is engaged with the battery buckle to limit longitudinal movement of the battery buckle and limit circumferential rotation of the battery buckle.

Optionally, the handheld infrared imager further includes a trigger button assembly, and the trigger button assembly includes:

a trigger fixing base;
a trigger; and
a button structure, which is provided between the trigger fixing base and the trigger and can, open or close a circuit when be pressed by the trigger; and wherein, the trigger button assembly further includes a rotating connection, via which one end of the trigger is connected to the trigger fixing base.

Optionally, the rotating connection includes a rotating shaft, and the rotating shaft passes through aligned mounting holes in the trigger fixing base and the trigger.

Optionally, the handheld infrared imager further includes a restoration member; wherein, the restoration member is provided between the trigger fixing base and the trigger, and provides an elastic force for the trigger to return and maintain in an initial position after the trigger is pressed, and a gap is provided between the button structure and the trigger in the initial position.

Optionally, the restoration member includes a torsion spring. The torsion spring is sleeved outside the rotating shaft, and torsion arms at both ends of the torsion spring abut against the trigger fixing base and the trigger, respectively.

Optionally, the button structure is a button PCB board, the trigger button assembly further includes a PCB board sealing pad that is adhered to one side of the button PCB board by a sealant.

Optionally, the PCB board sealing pad is made of a rubber material and includes a block; one side of the block is adhered by the sealant to a first side, where a switch contact portion is located, of the button PCB board, and the other side of the block is provided with a pressing protrusion, which can apply a force on the switch contact portion of the button PCB board when the pressing protrusion is pressed by the trigger.

Optionally, the button PCB board is provided with a mounting through hole; a mounting post is provided at a side, to which the first side of the button PCB board is adhered, of the block; a flange having a diameter larger than a diameter of the mounting through hole is provided on an outer sidewall of the mounting post; the flange passes through the mounting through hole from the first side of the button PCB board and is pressed tightly against a second side of the button PCB board different from the first side.

Optionally, the flange includes a gradually-varied section, and the gradually-varied section whose outer diameter gradually increases from outside to inside with respect to the block.

Optionally, the handheld infrared imager further includes a body; wherein, the trigger fixing base of the trigger button assembly is fixedly connected to the body by a bolt member, and a gasket is provided between the trigger fixing base and the body.

Optionally, the handheld infrared imager further includes:

a housing provided with an electronic component inside the housing and a first buckling portion outside the housing;

a display screen provided on the housing and electrically connected to the electronic component; and a light-shielding hood provided with a second buckling portion and detachably provided outside the housing by means of the first buckling portion and the second buckling portion so as to shield light for the display screen.

Optionally, the light-shielding hood includes an upper hood body provided above the display screen, and side hood bodies with upper ends thereof connected to the upper hood body and located at sides of the display screen; wherein, each of the upper hood body and the side hood bodies is provided with the second buckling portion.

Optionally, the upper hood body is provided with two second buckling portions that are close to two ends of the upper hood body respectively.

Optionally, each of the side hood bodies is provided with one second buckling portion, with two second buckling portions that is close to a lower end of the side hood body.

Optionally, the second buckling portion is perpendicular to a surface of the light-shielding hood where the second buckling portion is located.

Optionally, a protruding edge is provided at a side of the body having the display screen; wherein, the protruding edge is provided around an outer periphery of the housing, and the first buckling portion is a buckling groove provided in the protruding edge.

Optionally, a seal connected to the protruding edge and the housing is provided in the buckling groove.

Optionally, the light-shielding hood is made of a material capable of deforming when subjected to a force.

Optionally, the housing includes a front housing part and a rear housing part that is buckled to the front housing part through a protruding rib and a groove; wherein, the display screen and the light-shielding hood are both provided on the rear housing part.

An embodiment of the present application further provides a handheld infrared imager, which includes the battery module described above. The battery module is detachably connected to the main body of the handheld infrared imager. That is, the battery module is replaceable. The battery module is engaged with the handheld infrared imagery by means of the buckling structure designed thereon, so as to be disassembled/assembled and replaced at any time and any place.

In the embodiment of the present application, in the assembly of the cell and the battery cover, a positioning method with the fixed buckling of the sidewalls of the cell and protrusion-groove engagement of the bottom of the cell is used, so that the assembly is extremely simple.

In addition, in the present application, the buckling connection between the battery module and the main body of the device is achieved by means of the elastic sheet restoration. When adjusting the buckling force, only the bending angle of the elastic sheet needs to be adjusted, this process is simple. In addition, after the battery module is buckled into the main body of the device, the protruding rib provided on the soft rubber of the battery cover may eliminate the longitudinal clearance between the battery cover and the main body of the device that are engaged, so that the battery cover and the main body of the device are engaged in place without shaking. The assembly process of the battery module and the main body of the device is simple, which leads to good experience during the insertion and removal of the battery module, greatly improving the product experience.

In the present application, the battery module enables the battery to have a strong reusability. In the subsequent development and design of the product, the cell can be reused by only changing the state of the battery cover. That is, the existing cell can be used, as long as the battery cover is provided with corresponding protrusions and grooves for engaging with the cell. This greatly decreases the number of the types of cells and effectively reduces the cost for development, storage and management of cells.

BRIEF DESCRIPTION OF THE DRAWINGS

In order to illustrate the technical solutions in the embodiments of the present application or the prior art more clearly, the accompanying drawings used in the description of the embodiments or the prior art will be briefly described below. Obviously, the drawings in the following description are just some embodiments of the present application. Those skilled

In FIG. 4*b*, an elastic sheet 2 is at a position in a free state.

REFERENCE SIGNS

Figure 1:
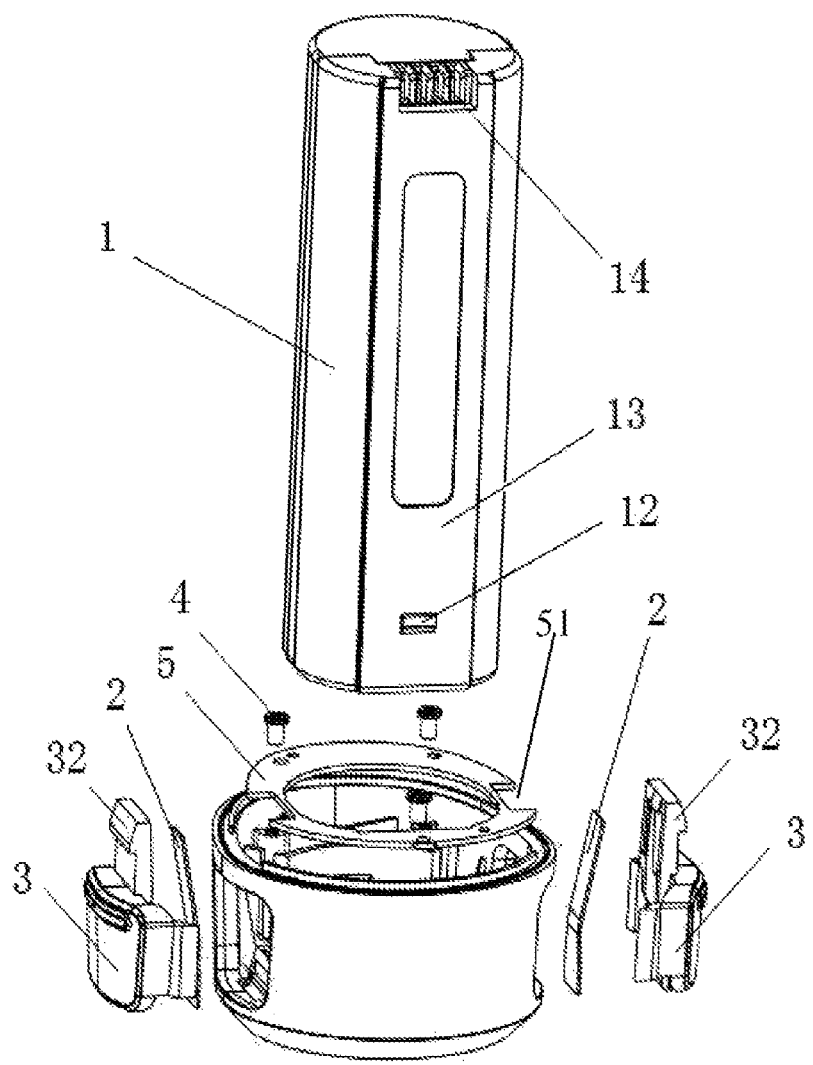
FIG. 1 is a schematic structural view of a battery module of a handheld infrared imager provided by an embodiment of the present application.

| 1 | cell | 33 | main body portion of battery buckle |
|---|---|---|---|
| 2 | elastic sheet | | |
| 3 | battery buckle | 51 | cover plate cutout |
| 4 | screw | 71 | circumferential positioning protrusion |
| 5 | cover plate | | |
| 7 | battery cover | 72 | longitudinal positioning groove |
| 11 | circumferential positioning hole | 73 | arc-shaped straight groove |
| | | 74 | elastic sheet groove |
| 75a | first additional sub-sidewall | 75 | additional sidewall |
| c | stud | 75b | second additional sub-sidewall |
| 12 | longitudinal positioning protrusion | d | support part |
| | | e | reinforcing rib |
| 13 | platform | 77 | hard rubber part |
| 14 | electric contact | 78 | soft rubber part |
| 31 | rotating shaft | 79 | thin rib |
| 32 | barb | 76 | accommodation hole |
| 6 | trigger fixing base | 8 | trigger |
| 9 | button PCB board | 10 | rotating connection |
| 15 | torsion spring | 16 | PCB board sealing pad |
| 17 | body | 18 | gasket |
| 19 | bolt member | 20 | trigger mounting lug |
| 23 | rotating shaft mounting hole of trigger fixing base | 21 | rotating shaft mounting hole of trigger |
| 22 | torsion arm positioning hole of trigger | 24 | mounting through hole of button PCB board |
| 25 | first side of button PCB board | 26 | second side of button PCB board |
| 34 | switch contact portion of button PCB board | 35 | socket |
| 36 | torsion arm of torsion spring | 61 | block |
| 62 | pressing protrusion | 63 | mounting post |
| 64 | flange | a | gradually-varied section of flange |
| 27 | housing | | |
| 39 | display screen | 38 | electrical component |
| 44 | seal | 40 | light-shielding hood |
| 46 | rear housing part | 45 | front housing part |
| 48 | first buckling portion | 47 | protruding edge |
| 50 | battery | 49 | core |
| 42 | side hood body | 41 | upper hood body |
| 30 | trigger button assembly | 43 | second buckling portion |

DETAILED DESCRIPTION

In order to make the purposes, technical solutions, and advantages of the present application more clearly, the technical solutions of the present application will be clearly and completely described below in combination with specific embodiments of the present application and corresponding drawings. Obviously, the described embodiments are only some rather than all of the embodiments of the present application. Based on the embodiments described in the present application, all other embodiments obtained by those skilled in the art without creative efforts shall fall within the scope of protection of the present application.

In the drawings, the same or similar reference signs are used to indicate the same or similar elements or elements having the same or similar functions. The embodiments of the present application will be described in detail below with reference to the drawings.

In the description of the embodiments of the present application, the orientations or positional relationships indicated by the terms "center", "longitudinal", "lateral", "front", "back", "left", "right", "vertical", "horizontal", "top", "bottom", "inner", "outer" or the like are based on the orientations or positional relationships shown in the drawings, and are only for convenience of describing the embodiments of the present application and simplifying the description, rather than indicating or implying that the referred means or elements must have the specific orientation, and be constructed and operated in the specific orientation, which therefore cannot be understood as a limitation on the scope of protection of the present application.

A battery module of a handheld infrared imager provided by an embodiment of the present application includes a cell and a battery cover. At an end of the cell adjacent to the battery cover, a circumferential positioning hole or a circumferential positioning protrusion is provided. At the bottom of the battery cover, a circumferential positioning protrusion or a circumferential positioning hole is correspondingly provided. The circumferential positioning protrusion and the circumferential positioning hole are engaged with each other to achieve relative circumferential positioning between the cell and the battery cover, thereby preventing the cell from rotating relative to the battery cover. A longitudinal positioning protrusion or a longitudinal positioning groove is provided on an outer peripheral sidewall of the cell, and a longitudinal positioning groove or a longitudinal positioning protrusion is correspondingly provided on a sidewall of the battery cover. The longitudinal positioning protrusion and the longitudinal positioning groove are engaged with each other to achieve relative longitudinal positioning between the cell and the battery cover.

Herein, the longitudinal direction refers to a direction in which the cell is inserted into the battery cover during the assembly of the cell and the battery cover; and the circumferential direction refers to a direction of rotating around the insertion direction or the longitudinal direction.

In the embodiment of the present application, in the assembly of the cell and the battery cover, a positioning method with the fixed buckling of the sidewalls of the cell and protrusion-groove engagement of the bottom of the cell is used, so that the assembly is extremely simple.

Figure 2:
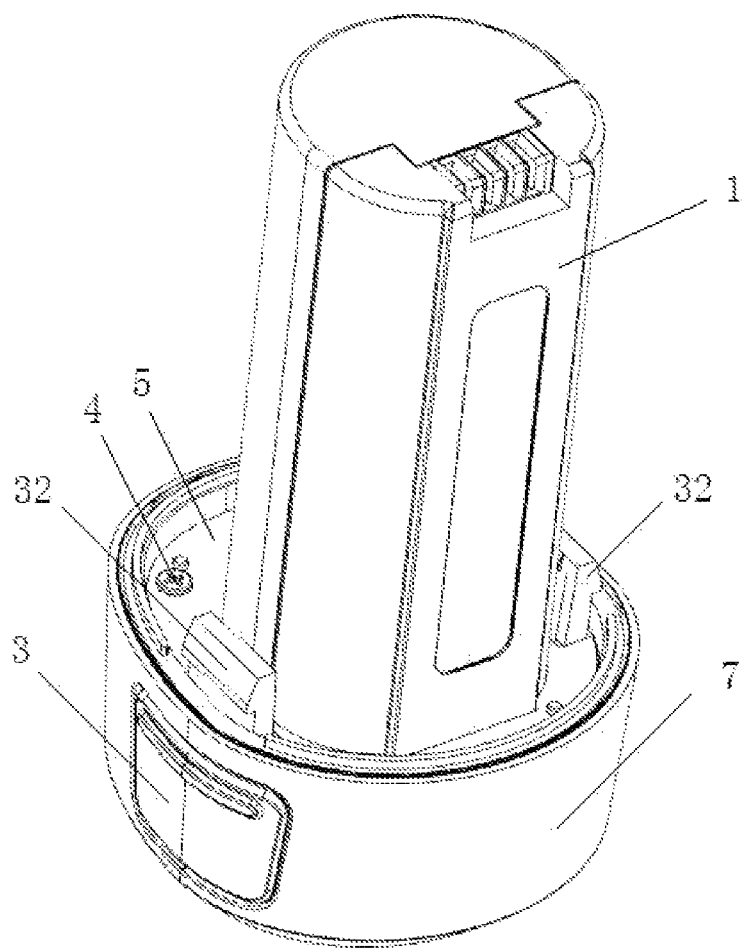
FIG. 2 is another schematic structural view of a battery module according to an embodiment of the present application.

FIG. 1 is a schematic view of a battery module according to an embodiment of the present application. FIG. 2 is another schematic view of the battery module according to the embodiment of the present application. As shown in FIG. 1, the battery module according to the embodiment of the present application includes a cell 1, an elastic sheet 2, two battery buckles 3, one or more screws 4, a cover plate 5, and a battery cover 7. The assembled battery module is shown in FIG. 2. The engagement of the battery module with a handheld device such as a handheld imager is shown in FIG. 3.

Figure 3:
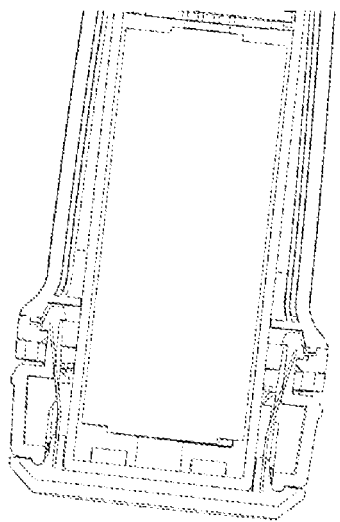
FIG. 3 is a schematic view showing engagement of a battery module and a handheld infrared imager according to an embodiment of the present application.

The battery module shown in FIGS. 1, 2 and 3 includes the cell 1 and the battery cover 7. The cell 1 (i.e., substantially the battery) is used to store electrical energy. The battery cover 7 is connected to the cell 1 so as to be mounted to the handheld device as a whole. The battery cover 7 forms a part of a housing of the handheld device. Specifically, the battery cover 7 is engaged with a housing of a main body of the handheld device, and the cell 1 is contained in the integral housing of the handheld device. Advantageously, the battery cover 7 is mounted to the main body of the handheld device so as to be detachable, particularly to be easily detached. The handheld device is, for example, a handheld infrared imager, a handheld recorder, etc., or even a handheld device with a large power consumption, such as a handheld electric firearm, for quickly replacing the battery.

Referring to FIG. 1, the cell 1 has an elongate shape. An electric contact 14 is provided at an upper part of the elongate cell 1, and is used to realize electrical connection with a circuit. It can be understood that an electricity storage material or an electricity storage structure is provided in the cell 1. The electricity storage material or electricity storage structure may be any suitable material or structure, as long as it can store and release the electrical energy. For example, the electricity storage structure can be a disposable dry battery or a rechargeable battery that may be reused.

In the embodiment shown in FIG. 1, the cell 1 has a substantially circular cross-section, and is longitudinally provided with a platform 13. The platform 13 may be used to be engaged with a corresponding structure of the cover plate 5 or of an additional sidewall 75 to limit the rotation position of the cell to a certain extent. It should be noted that the shape of the cell 1 is not limited to the shape shown in the figure.

A circumferential positioning hole 11 (see FIG. 5) is provided at an end of the cell 1 adjacent to the battery cover 7, and a circumferential positioning protrusion 71 (see FIGS. 4a and 4b) is correspondingly provided at the bottom of the battery cover 7. The circumferential positioning protrusion 71 and the circumferential positioning hole 11 are engaged with each other to achieve relative circumferential positioning between the cell 1 and the battery cover 7. The circumferential positioning hole 11 and the circumferential positioning protrusion 71 extend in the longitudinal direction to facilitate the insertion of the cell 1 into the battery cover 7. Generally, two circumferential positioning holes 11 spaced from each other are provided, and two circumferential positioning protrusions 71 are correspondingly provided. Three or four circumferential positioning holes 11 and circumferential positioning protrusions 71 may also be provided as required.

The cross-sectional shapes of the circumferential positioning hole 11 and the circumferential positioning protrusion 71 may be set as required. In the illustrated embodiment, the circumferential positioning hole 11 is of a cylindrical shape or a conical shape, and the circumferential positioning protrusion 71 is of a cylindrical shape or a cone frustum shape. Optionally, the circumferential positioning hole 11 may be a hemispherical hole or a square hole, and accordingly, the circumferential positioning protrusion 71 is a hemispherical protrusion or a square protrusion.

It can be understood that the circumferential positioning hole in the cell 1 may be replaced with a circumferential positioning protrusion, and accordingly, the circumferential positioning protrusion at the bottom of the battery cover 7 is replaced with a circumferential positioning hole. This can also achieve the same functions and technical effects, and also falls within the protection scope of the present application.

Figure 4A:
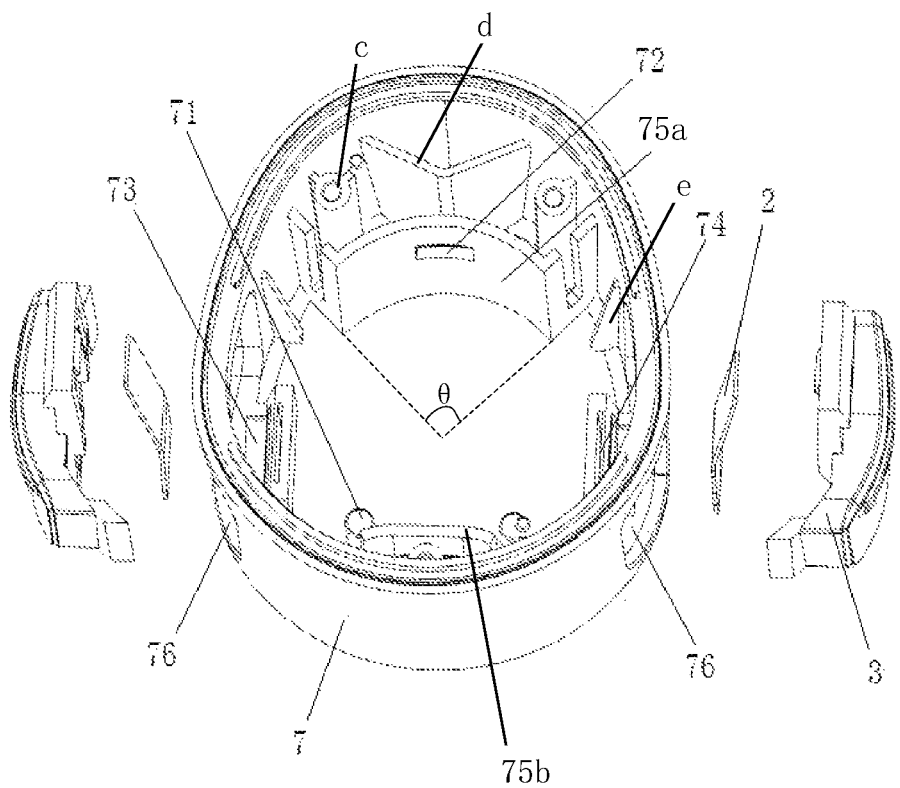
FIG. 4*a* and FIG. 4*b* schematically show an engagement relationship between a battery buckle and a battery cover according to an embodiment of the present application.
Figure 4B:
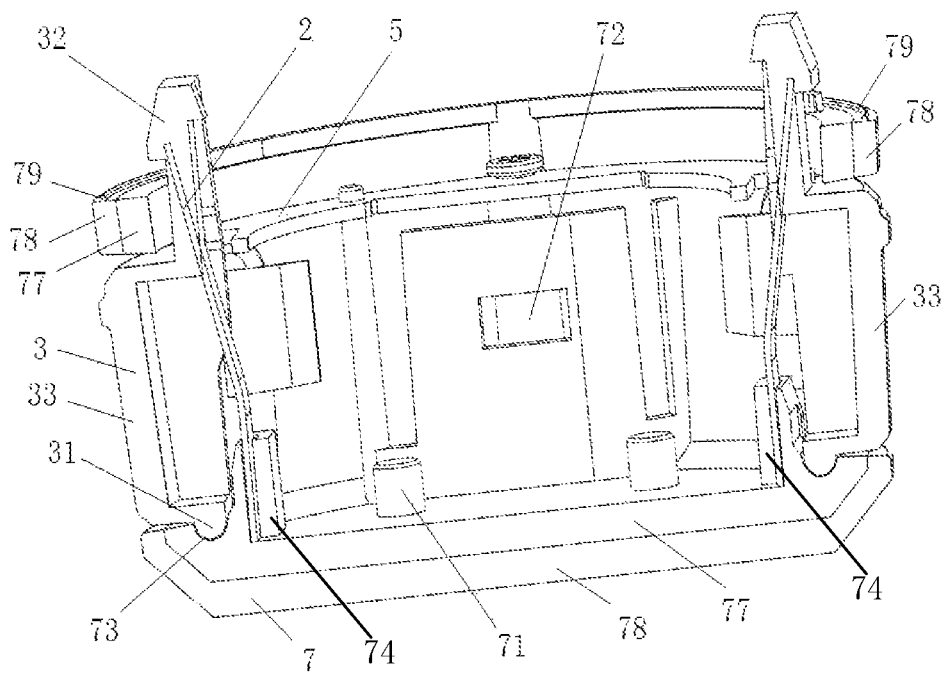

Referring to FIG. 1, a longitudinal positioning protrusion 12 (it also can be replaced with a longitudinal positioning groove) is provided on an outer peripheral sidewall of the cell 1. Referring to FIGS. 4a and 4b, a longitudinal positioning groove 72 (correspondingly, it also can be replaced with a longitudinal positioning protrusion) is correspondingly provided on a sidewall of the battery cover 7. The longitudinal positioning protrusion is engaged with the longitudinal positioning groove to achieve relative longitudinal positioning between the cell 1 and the battery cover 7. After the cell 1 is inserted in place, the longitudinal positioning protrusion 12 is stuck into the longitudinal positioning groove 72 to prevent relative longitudinal movement between the battery cover 7 and the cell 1.

As shown in FIG. 4a, the sidewall of the battery cover 7 includes an outer peripheral sidewall and an additional sidewall 75. The additional sidewall 75 is provided inside and spaced from the outer peripheral sidewall. The additional sidewall 75 extends upward from the bottom of the battery cover 7. The longitudinal positioning groove 72 is provided in the additional sidewall 75 and penetrates the additional sidewall 75. Advantageously, the additional sidewall 75 has a thickness smaller than the thickness of the outer peripheral sidewall, thereby being beneficial to improve the elasticity required for mounting. For example, the thickness (average thickness) of the additional sidewall 75 is set to be less than 1.5 mm.

Figure 5:
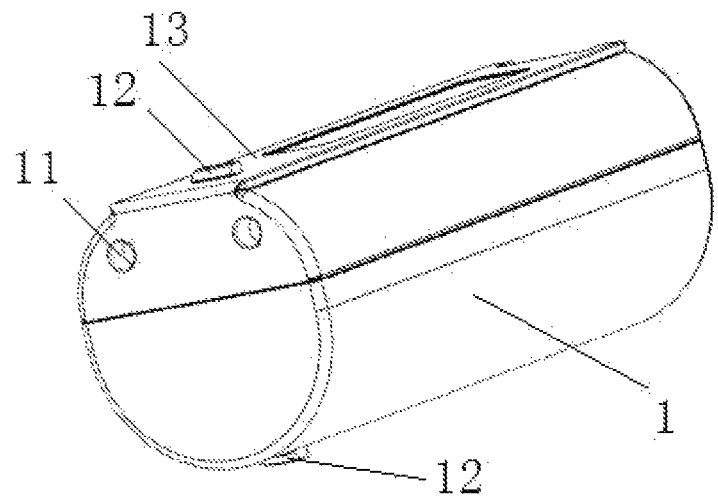
FIG. 5 shows a perspective view of a cell.

Referring to FIG. 5, two longitudinal positioning protrusions 12 are provided on the cell 1. The two longitudinal positioning protrusions 12 are provided away from each other, or at an angle of approximately 180 degrees apart along the circumference. Referring to FIG. 4a, the additional sidewall 75 extends along a partial circumference thereof, and includes a first additional sub-sidewall 75a and a second additional sub-sidewall 75b.

The first additional sub-sidewall 75a may further include left and right grooved sub-sections and a middle arc-shaped sub-section. The middle arc-shaped sub-section is provided with the longitudinal positioning groove 72. The left and right grooved sub-sections may be used to fix the middle arc-shaped sub-section, and may rebound after the middle arc-shaped sub-section is deformed. The shapes of the first additional sub-sidewall 75a and the second additional sub-sidewall 75b may be set to comply with the shape of the outer periphery of the cell 1. The first additional sub-sidewall 75a may be provided to have a certain thickness and is not connected to the inner sidewall of the battery cover 7, so that the first additional sub-sidewall 75a may be elastically deformed when the cell 1 is inserted, which is convenient for the insertion of the cell 1.

The center angle θ for the first additional sub-sidewall 75a and the second additional sub-sidewall 75b respectively is less than 90 degrees, for example, 60 degrees, 45 degrees, 30 degrees, or another suitable angle. Each of the first additional sub-sidewall 75a and the second additional sub-sidewall 75b is provided with the longitudinal positioning groove 72 in the middle along the circumferential direction thereof.

In FIG. 4a, the battery cover 7 may further include a stud c, a reinforcing rib d, and a reinforcing rib e therein. The stud c may be engaged with a screw for fixing the cover plate 5 so as to fix the cover plate 5. The reinforcing rib d may be used to strengthen and fix the sidewall and bottom of the battery cover 7. When the cell 1 is placed into the battery cover 7, the reinforcing rib e may be used to fix the cell 1 so that the cell 1 is more tightly attached to the battery cover.

In the illustrated example, the two longitudinal positioning protrusions are substantially evenly distributed along the circumference. Accordingly, the longitudinal positioning grooves 72 engaged with the longitudinal positioning protrusions 12 are also substantially evenly distributed along the circumference correspondingly. It can be understood that it is also possible to provide three or four longitudinal positioning protrusions evenly distributed along the circumference, as required.

Advantageously, the inner side of the additional sidewall 75 is engaged with the outer surface of the cell, to guide the insertion of the cell and to assist the positioning or limitation of the cell.

As shown in FIG. 1, the battery module includes a battery buckle 3 and an elastic sheet 2. One end of the battery buckle 3 (the upper end, i.e., the end away from the bottom of the battery cover in FIG. 1) is provided with a barb 32 that is cooperatively connected to the main body of the handheld device. The barb 32 is used to be engaged with a corresponding structure on the main body of the device, so as to connect the entire battery module to the main body of the device through a buckling element. The battery buckle 3 is provided with a rotating shaft 31 at a portion thereof away from the barb 32. The rotating shaft 31 is rotatably engaged with the battery cover 7 to allow the battery buckle 3 to swing around the rotating shaft 31. When the battery buckle 3 swings outward, the barb 32 on the battery buckle 3 moves outward and is engaged with a corresponding buckling element provided on the main body of the device to prevent the battery module from being removed from the main body of the device. When the battery buckle 3 swings inward, the barb 32 on the battery buckle 3 moves inward and disengages from the corresponding buckling element on the main body of the device, thereby allowing the battery module to be removed from the main body of the device.

One end of the elastic sheet 2 is inserted and mounted into the battery cover 7. Specifically, the elastic sheet 2 is inserted into an elastic sheet groove 74 (see FIGS. 4a and 4b). The other end (upper end) of the elastic sheet 2 abuts against the inner side of the battery buckle 3 and applies an outward elastic force on the battery buckle 3. Therefore, the battery buckle 3 is kept in an outwardly expanded position, and thus the barb 32 of the battery buckle 3 is also kept in the outwardly expanded position so as to be engaged with the corresponding buckling element on the main body of the device, thereby preventing the battery module from being removed from the main body of the device. Advantageously, the elastic sheet 2 is a stainless-steel elastic sheet.

In the prior art, a deformation due to buckling between the battery module and the main body of the device is usually restored by the deformation of soft rubber, and the adjustment of the human-machine experience of the buckling force needs to be performed by multiple model modifications, which process is complicated and has a long cycle. In the embodiment of the present application, only the bending angle of the elastic sheet needs to be adjusted to adjust the aforementioned elastic force, thereby adjusting the buckling force and improving the human-machine experience.

Referring to FIG. 1 and FIG. 4a, there are two battery buckles 3 and two elastic sheets 2, with one set of a battery buckle 3 and an elastic sheet 2 and the other set of a battery buckle 3 and an elastic sheet 2 provided facing away from each other. Advantageously, an accommodation hole 76 is provided in the battery cover 7. The main body portion of the battery buckle 3 is accommodated in the accommodation hole 76, and the outer surface of the main body portion 33 of the battery buckle 3 is substantially flush with the outer surface of the battery cover 7 to improve aesthetics. Specific shapes of the main body portion of the battery buckle 3 and the accommodation hole 76 may be set as required. Advantageously, a stopper is provided on the periphery of the main body portion of the battery buckle 3, and the stopper is engaged with the inside of the sidewall of the battery cover 7 to prevent the battery buckle 3 from falling off the battery cover 7.

By pressing the outer surface of the main body portion of the battery buckle 3, the battery buckle 3 may be caused to swing inward.

Referring to FIG. 4a, the battery buckle 3 and the longitudinal positioning protrusion 12 on the cell 1 are staggered from each other in the circumferential direction. This helps to avoid interference and helps to improve the compactness of the entire structure.

Still referring to FIG. 4b, the rotating shaft 31 of the battery buckle 3 has a semicircular or inferior arc cross-section. Accordingly, an arc-shaped straight groove 73 is provided in the battery cover 7. The rotating shaft 31 is rotatably engaged inside the arc-shaped straight groove 73. The arc-shaped straight groove has an arc-shaped or arched cross-section.

In order to prevent the rotating shaft 31 from coming out of the arc-shaped straight groove 73, the main body portion of the battery buckle 3 has a height substantially equal to the height of the accommodation hole 76, and the fitting clearance in the height direction is set to be relatively small. For example, the fitting clearance is set to about 3 mm. Of course, this fitting clearance cannot be set too small; otherwise it will affect the mounting and swinging movement of the battery buckle 3.

Further, the battery module is provided with a cover plate 5. The cover plate 5 is fixedly connected to the battery cover 7 by a screw 4. The cover plate 5 is engaged with the battery buckle 3 to limit the longitudinal movement of the battery buckle 3 and limit the circumferential rotation of the battery buckle. Specifically, the distance or clearance between the cover plate 5 and the top of the main body portion of the battery buckle 3 is less than a set length, thereby limiting the longitudinal movement of the battery buckle to prevent the battery buckle 3, when swinging, from coming out of the accommodation hole 76 and further prevent the rotating shaft 31 from coming out of the arc-shaped straight groove 73. The distance or clearance between the cover plate 5 and the top of the main body portion of the battery buckle 3 may be set to about 2 mm. For example, the distance or clearance may be set in a range of 1 mm to 2.5 mm, and preferably in a range of 1.2 mm to 2 mm.

Referring to FIG. 1, the cover plate 5 is provided with two cover plate cutouts 51, each of which is engaged with two sides of a buckling element on the battery buckle 3 to limit the circumferential position of the battery buckle 3.

The battery cover 7 is a two-color injection-molded part, with a surface layer made of a soft rubber material and an inner layer made of hard plastic. Referring to FIGS. 4a and 4b, the battery cover 7 includes a hard rubber part 77 and a soft rubber part 78. The hard rubber part 77 and the soft rubber part 78 are integrally formed by two-color injection molding. The surface layer soft rubber (the soft rubber part 78) of the battery cover 7 is provided with a protruding thin rib 79 at the end surface abutting against the main body of the device. The thin rib 79 has a width less than or equal to 2 mm and has a protruding height less than or equal to 2 mm.

The embodiment of the present application further provides a handheld infrared imager, which includes the battery module described above. The battery module is detachably connected to the main body of the handheld infrared imager. That is, the battery module is replaceable. The battery module is engaged with the handheld thermal infrared imager by means of the buckling structure designed thereon, so as to be disassembled/assembled and replaced at any time and any place.

In addition, the buckling connection between the battery module and the main body of the device according to the embodiment of the present application is realized by means of the restoration of the elastic sheet. When adjusting the buckling force, only the bending angle of the elastic sheet needs to be adjusted, this process is simple. In addition, after the battery module is buckled into the main body of the device, the protruding rib (that is, the thin rib 79) provided on the soft rubber of the battery cover may eliminate the longitudinal clearance between the battery cover and the main body of the device that are engaged, so that the battery cover and the main body of the device are engaged in place without shaking. The assembly process of the battery module and the main body of the device is simple, which leads to good experience during the insertion and removal of the battery module, greatly improving the product experience.

The battery module according to the embodiment of the present application enables the battery to have a strong reusability. In the subsequent development and design of the product, the cell can be reused by only changing the state of the battery cover. That is, the existing cell can be used, as long as the battery cover is provided with corresponding protrusions and grooves for engaging with the cell. This greatly decreases the number of types of cells and effectively reduces the cost for development, storage and management of cells.

The handheld infrared imager provided by the embodiment of the present application may further include a trigger button assembly.

Figure 6:
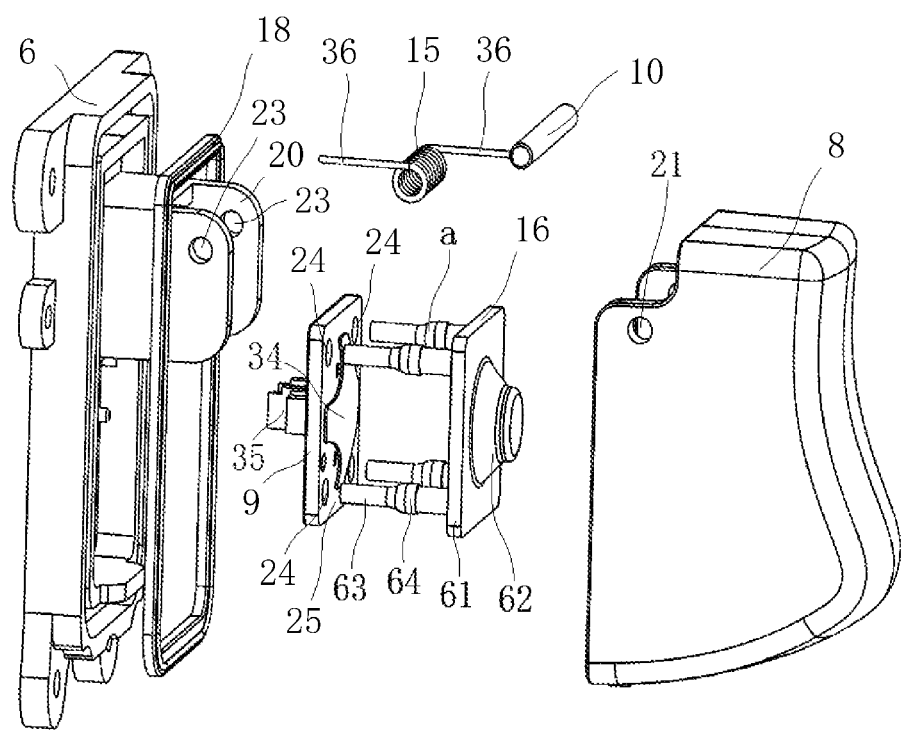
FIG. 6 is a schematic exploded view of a trigger button assembly of a handheld infrared imager according to an embodiment of the present application.
Figure 7:
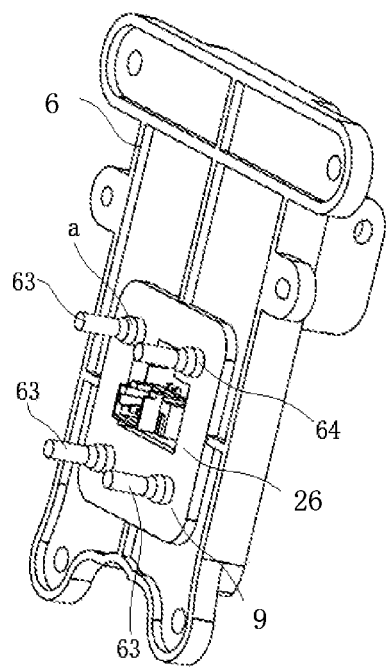
FIG. 7 is a schematic structural view showing the trigger button assembly of FIG. 6 in an assembled state from another perspective.

As shown in FIG. 6 and FIG. 7, the trigger button assembly provided by the embodiment includes a trigger fixing base 6, a trigger 8, a button structure, and a rotating connection 10. The button structure is provided between the trigger fixing base 6 and the trigger 8, and can close or open a circuit when be pressed by the trigger 8. One end of the trigger 8 is connected to the trigger fixing base 6 via the rotating connection 10.

In this embodiment, one end of the trigger 8 is connected to the trigger fixing base 6 via the rotating connection 10, and thus the trigger 8 is movably engaged with the trigger fixing base 6 via the rotating connection 10, so that the trigger 8 rotates when pressed, so as to touch and move the button structure. In this way, the pressing feel of the trigger 8 can be effectively improved, thereby improving the trigger button experience.

In one embodiment, the rotating connection 10 includes a rotating shaft. In order to mount the rotating shaft, one side of the trigger fixing base 6 for mounting the trigger 8 is provided with trigger mounting lugs 20. Each of two spaced trigger mounting lugs is provided with a rotating shaft mounting hole 23 therein, and correspondingly, the trigger 8 is provided with rotating shaft mounting holes 21 at one end thereof. When mounting the rotating shaft, the rotating shaft mounting holes 23 of the trigger fixing base 6 are aligned with the rotating shaft mounting holes 21 of the trigger 8 and then one end of the rotating shaft is inserted from the rotating shaft mounting hole on one side to the rotating shaft mounting hole on the other side. At this time, both ends of the rotating shaft are rotatably mounted in the aligned mounting holes of the trigger fixing base 6 and the trigger 8 so that the other end of the trigger 8 may rotate about the rotating shaft. In this embodiment, the rotating shaft is made of a material with excellent wear resistance and oxidation resistance, which is wear-resistant and has a long service life.

In one embodiment, the trigger button assembly further includes a restoration member, which is provided between the trigger fixing base 6 and the trigger 8 and provides an elastic force for the trigger 8 to return and maintain in the initial position after the trigger 8 is pressed. A gap is provided between the button structure and the trigger 8 in the initial position, thereby ensuring that the pressed trigger 8 can be released in time so as to be separated from a switch contact portion of the button structure to avoid accidentally triggering the switch contact portion of the button structure. The size of the gap between the button structure and the trigger 8 in the initial position can be set based on an actual situation.

Figure 8A:
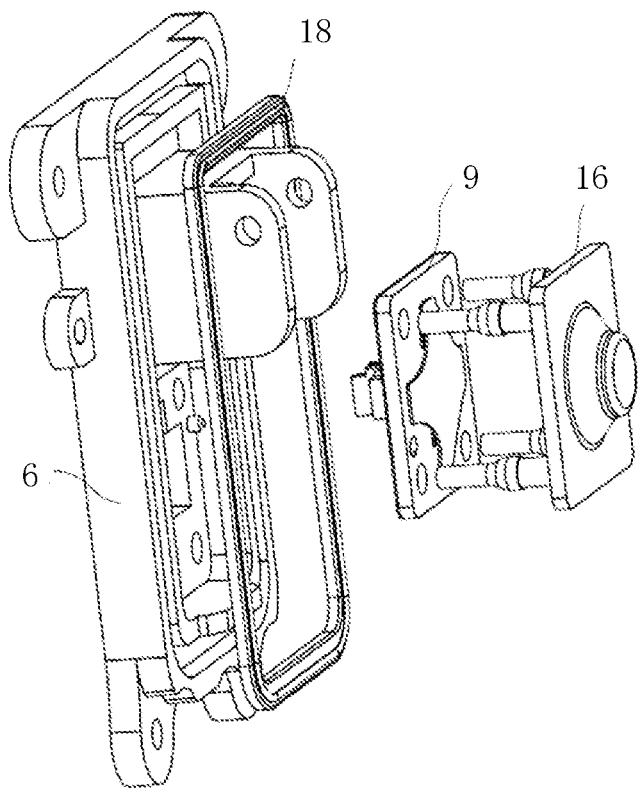
FIG. 8*a* is a schematic assembly view of a trigger fixing base, a gasket, a button structure, and a PCB board sealing pad of the trigger button assembly of FIG. 6.
Figure 8B:
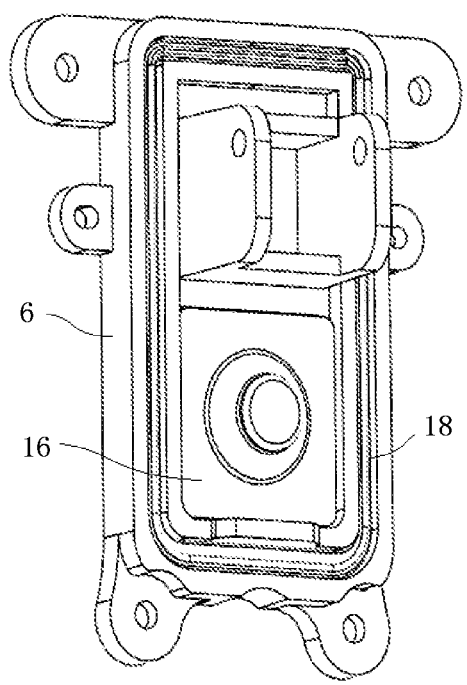
FIG. 8*b* is a schematic view of the trigger fixing base, gasket, button structure and PCB board sealing pad in FIG. 8*a* in an assembled state.
Figure 8C:
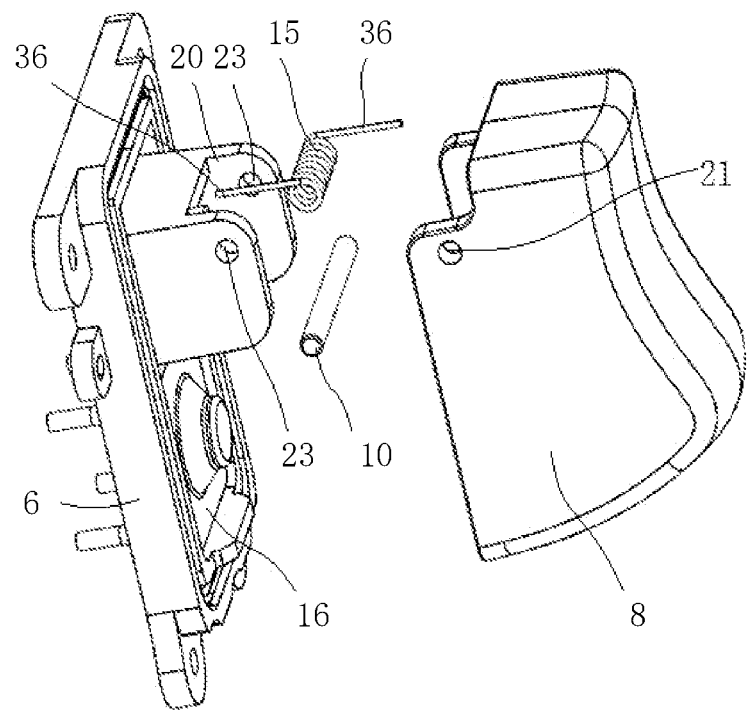
FIG. 8*c* is a schematic assembly view of the assembly, in an assembled state, in FIG. 8*b* and a trigger, a rotating connection and a torsion spring of the trigger button assembly in FIG. 6.
Figure 8D:
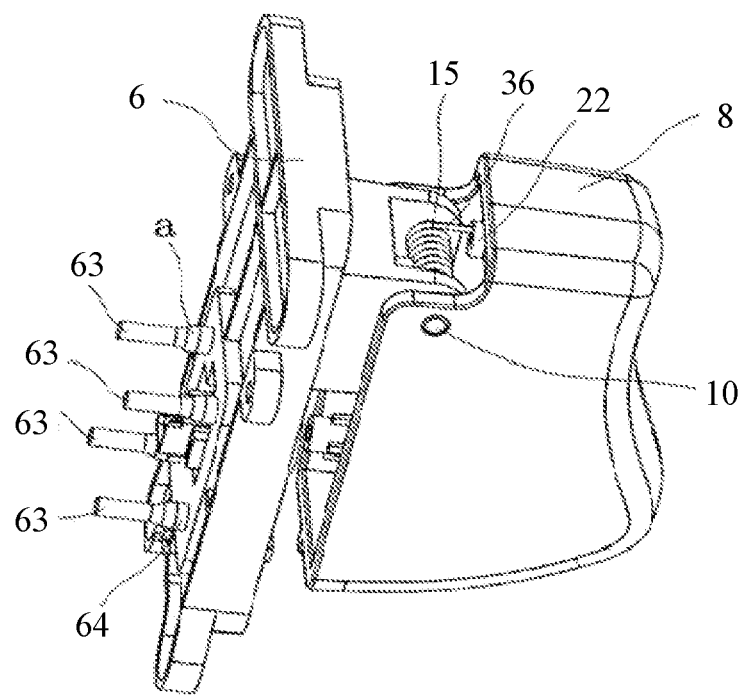
FIG. 8*d* is a schematic view of the trigger button assembly in FIG. 8*c* in an assembled state.

In an embodiment, referring to FIGS. 6, 8c and 8d, the restoration member includes a torsion spring 15 which is sleeved outside a portion of the rotating shaft between the rotating shaft mounting holes. Torsion arms 36 at both ends of the torsion spring 15 abut against the trigger fixing base 6 and the trigger 8 respectively. Specifically, a torsion arm 36 at one end of the torsion spring 15 is inserted into a torsion arm positioning hole 22 formed in the trigger 8, and a torsion arm 36 at the other end of the torsion spring 15 is inserted into a torsion arm positioning hole (not shown) formed in the trigger fixing base 6, thereby providing the elastic force for maintaining the trigger 8 in the initial position. A reverse force provided by the torsion spring 15 enables the user to feel the restoration action of the trigger 8 more clearly, which is beneficial to improve the effect of the trigger button experience.

In one embodiment, referring to FIG. 6, FIG. 8*a* and FIG. 8*b*, the button structure is a button PCB (Printed Circuit Board) board 9, and the button PCB board 9 may be a commercially available product. The trigger button assembly further includes a PCB board sealing pad 16, which is adhered to one side of the button PCB board 9 by a sealant (such as 3M glue or the like). The PCB board sealing pad 16 may prevent water accumulated in the trigger 8 from entering the button PCB board 9, thereby ensuring the electrical performance of the button PCB board 9.

In one embodiment, the PCB board sealing pad 16 is made of a rubber material, and includes a block 61. One side of the block 61 is adhered by the sealant to a first side 25, where the switch contact portion is located, of the button PCB board 9, while the other side of the block 61 is provided with a pressing protrusion 62, and the pressing protrusion 62 is aligned with or corresponds to the position of the switch contact portion 34 on the button PCB 9, so as to apply a force on the switch contact portion 34 of the button PCB board 9 when the pressing protrusion is pressed by the trigger 8.

In one embodiment, the button PCB board 9 is provided with a mounting through hole 24. For example, one mounting through hole 24 is provided at each of four corners of the button PCB board 9. One or more mounting posts 63 are provided at a side, to which the first side 25 of the button PCB board 9 is adhered, of the block 61, and a flange 64 having a diameter larger than that of the mounting through hole 24 is provided on an outer sidewall of a mounting post 63. The flange 64 passes through the mounting through hole 24 from the first side 25 of the button PCB board 9, and is pressed towards the button PCB board 9 against a second side 26 of the button PCB 9 different from the first side 25. This is beneficial to the sealing performance of the PCB board sealing pad 16 sealing the button PCB board 9. A socket 35 is provided at the second side 26 of the button PCB board 9 to form an electrical connection with a mainboard of the thermal imaging device. After the switch contact portion 34 is pressed, the socket 35 closes or opens a circuit formed with the mainboard of the thermal imaging device.

In one embodiment, as shown in FIG. 8*d*, the flange 64 includes a gradually-varied section a, whose outer diameter gradually increases from outside to inside with respect to the block 61. This structure is beneficial to provide a fastening force for the attachment of the PCB board sealing pad 16 to the button PCB board 9 when the PCB board sealing pad 16 is assembled onto the first side 25 of the button PCB board 9.

Figure 8E:
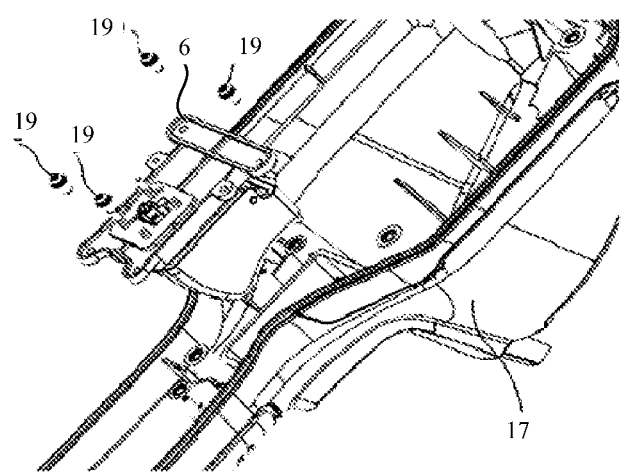
FIG. 8*e* is a schematic assembly view showing the assembling of the trigger button assembly in FIG. 8*d* onto a body.
Figure 8F:
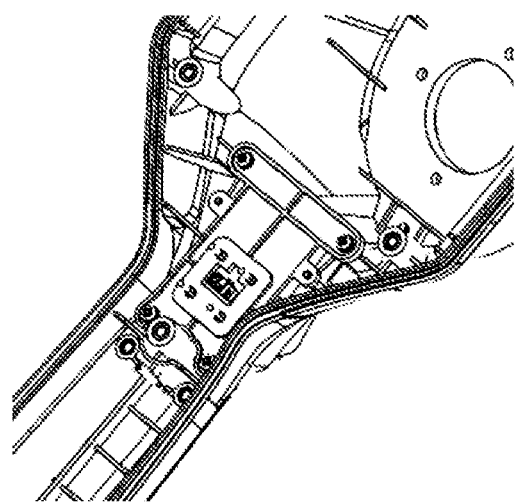
FIG. 8*f* is a schematic structural view of a handheld infrared imager assembled by the trigger button assembly and the body in FIG. 8*e*.
Figure 8G:
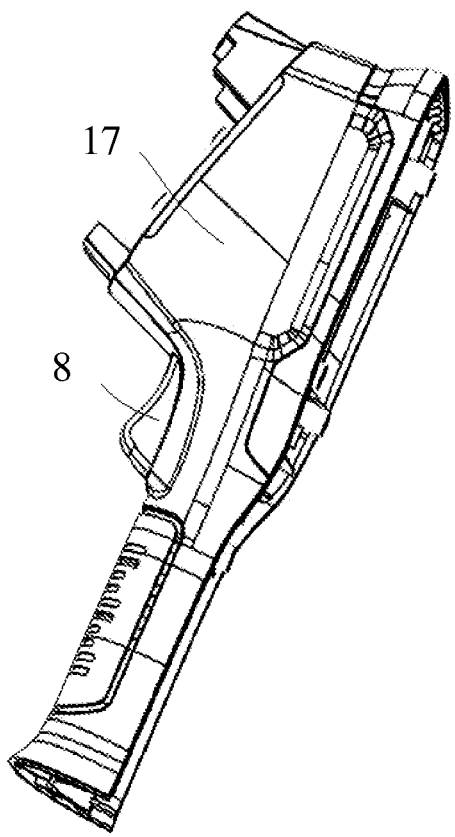
FIG. 8*g* is a schematic structural view of the handheld infrared imager in FIG. 8*f* from another perspective.

As shown in FIG. 8*e*, FIG. 8*f* and FIG. 8*g*, an embodiment of the present application further provides a thermal imaging device. The thermal imaging device includes the trigger button assembly according to the above embodiments. The thermal imaging device may be a handheld infrared imager.

In one embodiment, the thermal imaging device includes a body 17, the trigger fixing base 6 of the trigger button assembly is fixedly connected to the body 17 through a bolt member 19, and a gasket 18 is provided between the trigger fixing base 6 and the body 17 to provide waterproof protection for the body 17. The shape of the gasket 18 may be selected based on the size of the trigger fixing base 6. The trigger 8 is visible from the outside of the body 17. The material of the gasket may be selected from those that are commercially available.

The handheld infrared imager provided by the embodiment of the present application may further include a detachable light-shielding hood 40.

Figure 9:
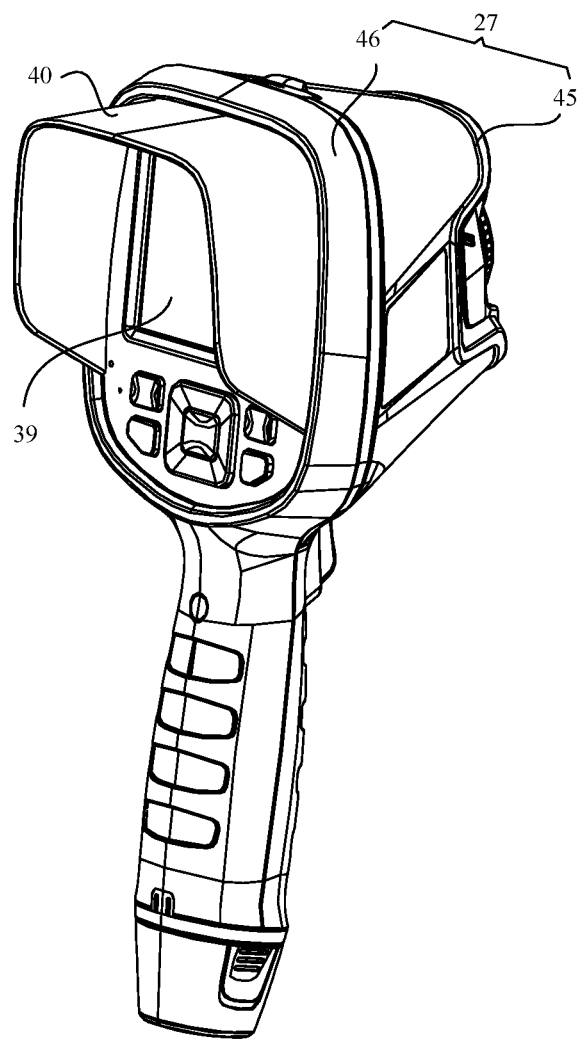
FIG. 9 is a schematic structural view of a handheld infrared imager provided by an embodiment of the present application.
Figure 10:
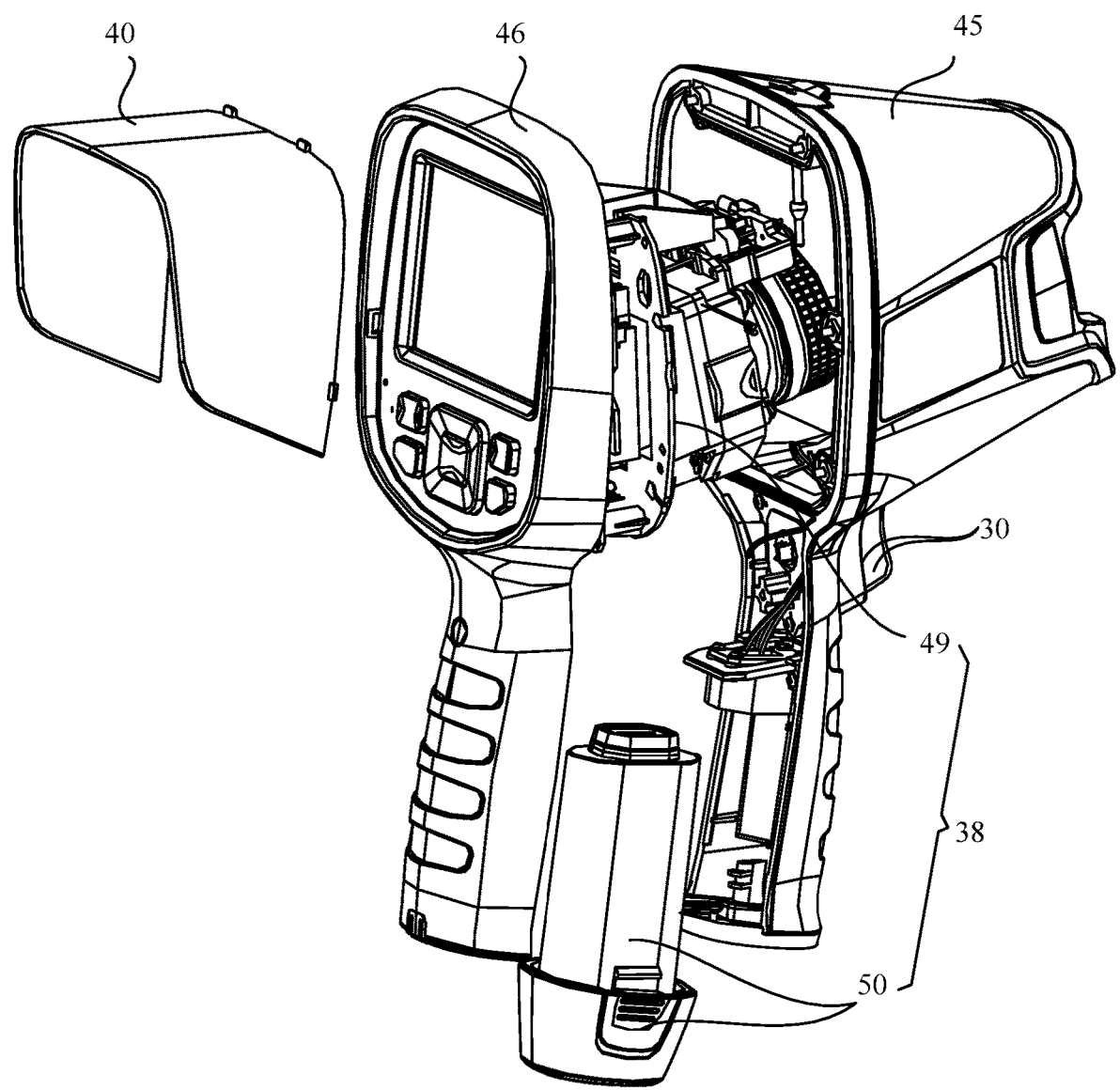
FIG. 10 is a schematic exploded view of the handheld infrared imager shown in FIG. 9.
Figure 11:
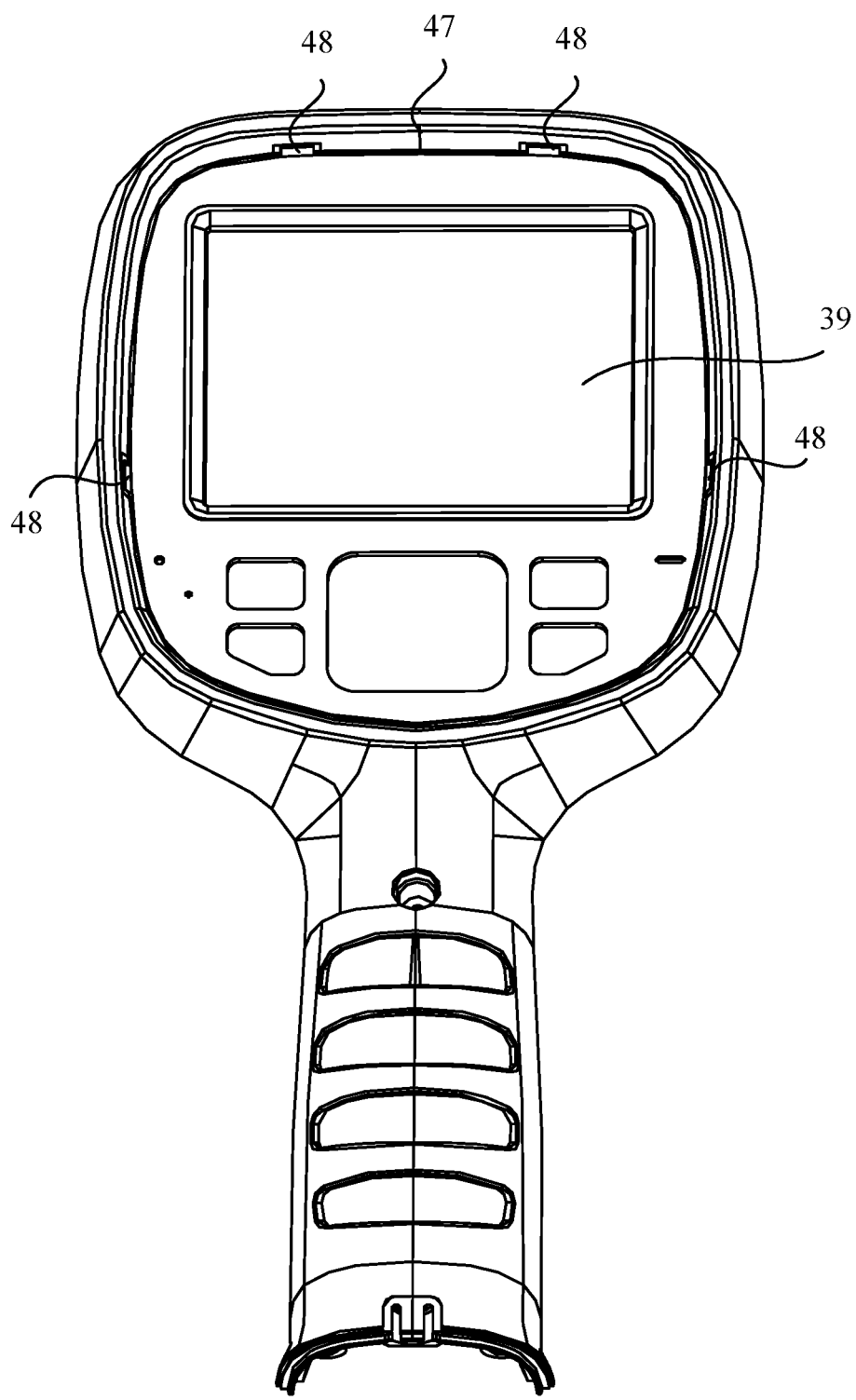
FIG. 11 is a schematic structural view showing a side, on which a display screen is mounted, of a rear housing part provided by an embodiment of the present application.
Figure 12:
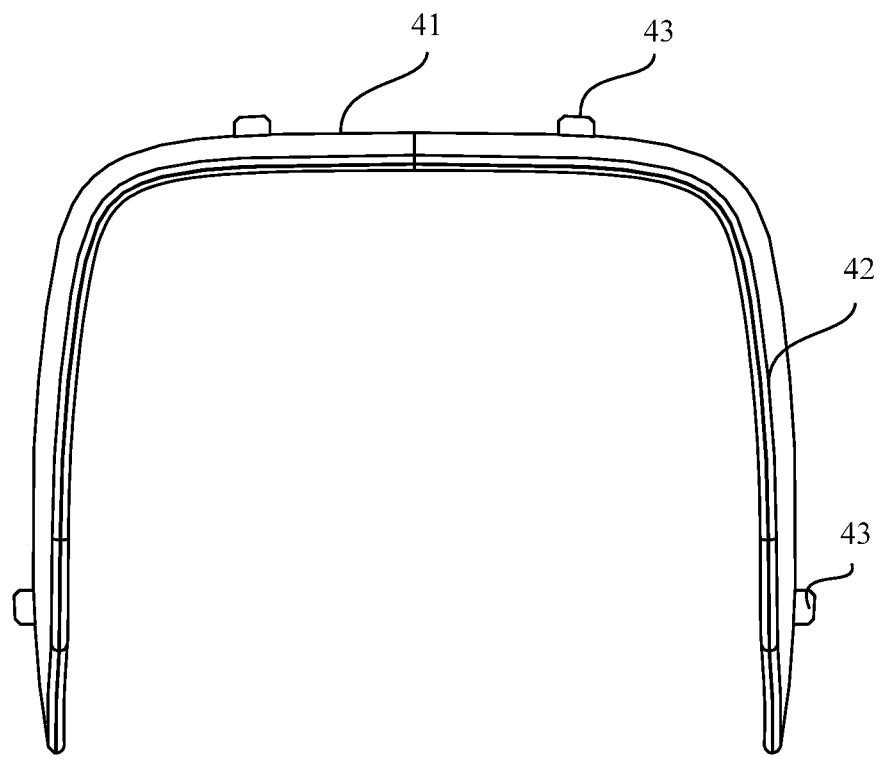
FIG. 12 is a schematic structural view of a light-shielding hood provided by an embodiment of the present application.
Figure 13:
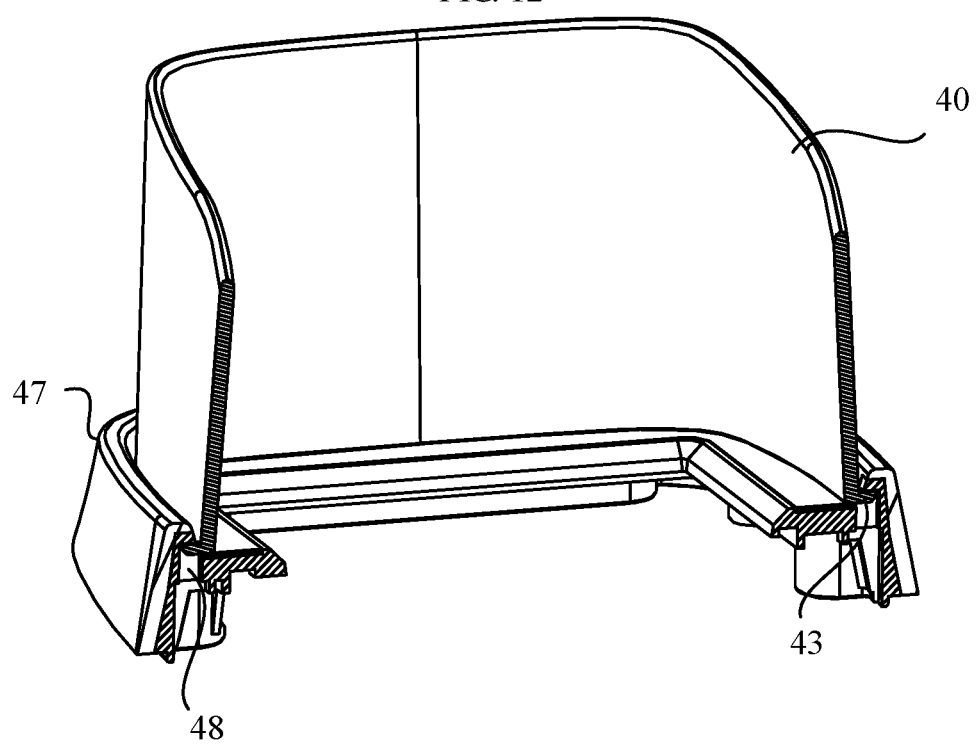
FIG. 13 is a schematic structural view showing the buckling of a first buckling portion and a second buckling portion provided by an embodiment of the present application.

As shown in FIG. 9 and FIG. 10, the handheld infrared imager according to the embodiment of the present application includes a housing 27, a display screen 39 provided on the housing 27, and a light-shielding hood 40 provided outside the housing 27 to shield the display screen 39. An electronic component 38 is provided inside the housing 27, and the display screen 39 is electrically connected to the electronic component 38. As shown in FIGS. 11 to 13, a first buckling portion 48 is provided on the outside of the housing 27, and a second buckling portion 43 is provided on the light-shielding hood 40. When it is necessary to use the light-shielding hood 40, the light-shielding hood 40 is fixed to the housing 27 through the first buckling portion 48 and the second buckling portion 43. When it is unnecessary to use the light-shielding hood 40, the second buckling portion 43 is withdrawn from the first bucking portion 48 so as to detach the light-shielding hood 40 from the housing 27.

The light-shielding hood 40 is detachably provided outside the housing 27 through the first buckling portion 48 and the second buckling portion 43 to shield light for the display screen 39. The handheld infrared imager as described above may further include the trigger button assembly 30 provided by the embodiment of the present application.

The first buckling portion 48 and the second buckling portion 43 can achieve a detachable connection between the housing 27 and the light-shielding hood 40. In this way, where the light intensity is relatively weak, e.g., on a cloudy day or indoors, and when the light-shielding hood 40 is not needed, the light-shielding hood 40 may be detached from the housing 27 to reduce the influence of the light-shielding hood 40 on the imager.

Various components of the imager may have various structures. Hereinafter, a specific embodiment is taken as an example to introduce the structure of each of the components of the imager in detail.

A protruding edge 47 is provided on one surface of the housing 27 where the display screen 39 is located, wherein, the protruding edge 47 is provided around the outer periphery of the housing 27.

The housing 27 may include a front housing part 45 and a rear housing part 46, wherein the display screen 39 and the light-shielding hood 40 is provided on the rear housing part 46. A groove may be provided on the front housing part 45, a protruding rib may be provided on the rear housing part 46, and the rear housing part 46 is fixed to the front housing part 45 through the groove and the protruding rib to improve the convenience of mounting. The rear housing part 46 is provided with a protruding edge 47 protruding rearward ("rearward" means a direction away from the front housing part 45), the protruding edge 47 and the display screen 39 are provided on the same side of the rear housing part 46, and the protruding edge 47 is circumferentially provided around the outer periphery of the rear housing part 46. Curved shapes of the inner surface and the outer surface of the protruding edge 47 comply with a curved shape of the side of the rear housing part 46.

Also, the groove may be provided on the rear housing part 46 while the protruding rib is provided on the front housing part 45. In this way, the front housing part 45 can also be buckled with the rear housing part through the protruding rib and groove.

A first buckling portion 48 is provided on the protruding edge 47. Here, the first buckling portion 48 is preferably selected as a buckling groove to facilitate processing. The number of the first buckling portions 48 is the same as that of the second buckling portions 43, with each of the first buckling portions 48 buckled into one different second buckling portion 43.

Figure 14:
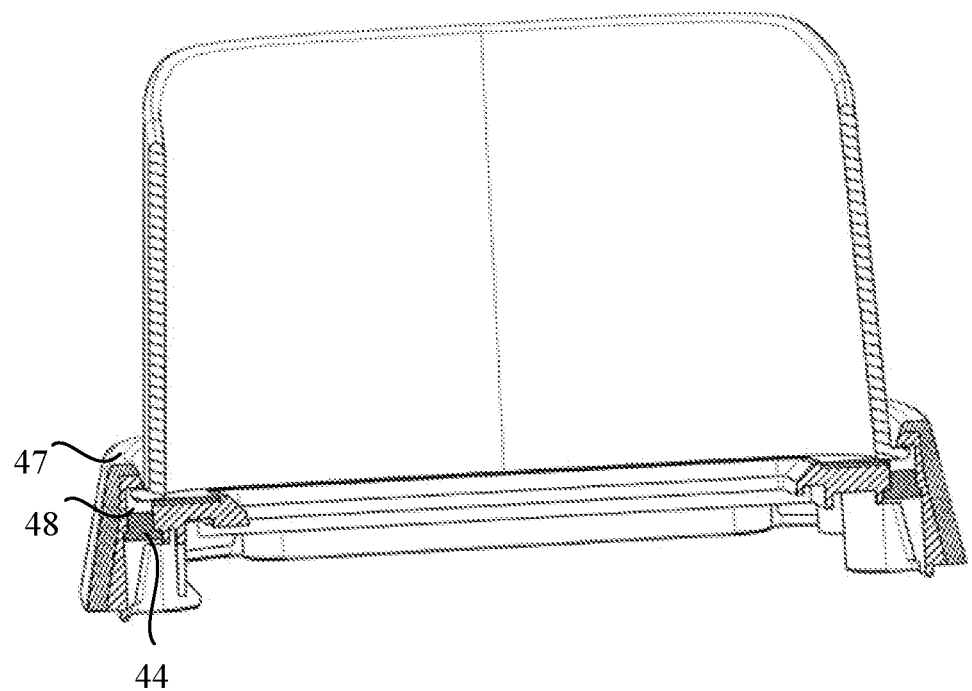
FIG. 14 is a schematic structural view in which a seal is provided in a first buckling portion provided by an embodiment of the present application.

The protruding edge 47 may be adhered to the rear housing part 46 to facilitate the mounting of a seal 44 (as shown in FIG. 14) in the buckling groove. The seal is used to be connected to the protruding edge and the housing so as to reduce a possibility of dust, moisture and the like entering the housing 27. The shape of the inner surface of the protruding edge 47 may be same as that of the outer surface of the contact portion of the rear housing part 46, and have a certain curvature. The seal 44 may be a sealing block or the like, and is adhered to the protruding edge 47 and the rear housing part 46 by an adhesive.

The electronic component 38 includes a core 49 and a battery 50. The display screen 39 is connected to the core 49, and the core 49 is connected to the battery 50. The core 49 is mounted on the front housing part 45, and the battery 50 is mounted at a position of a handle of the housing 27.

The battery 50 may be the battery module provided by this embodiment.

The light-shielding hood 40 includes an upper hood body 41 covering the display screen 39 from above, and side hood bodies 42 covering the display screen 39 from two sides. The upper ends of the side hood bodies 42 are connected to the upper hood body 41. One side hood body 42 is provided at each of two ends of the upper hood body 41, and the upper hood body 41 is smoothly transited to the side hood bodies 42 at a connection position.

Each of the upper hood body 41 and the side hood bodies 42 is provided with the second buckling portion 43.

Both the upper hood body 41 and the side hood bodies 42 are plate-shaped structures, and the outer surface of the upper hood body 41 and the outer surfaces of the side hood bodies 42 may have a certain curvature. After the light-shielding hood 40 is fixed to the housing 27, the outer surface of the upper hood body 41 and the outer surfaces of the side hood bodies 42 are respectively in contact with the inner surface of the protruding edge 47 of the housing 27 at the corresponding positions, so as to support light-shielding hood 40 through the protruding edge 47, thereby improving firmness for securing the light-shielding hood 40.

In this case, the material of the light-shielding hood 40 may be selected from a material capable of deforming when subjected to a force, such as an engineering plastic material, so as to facilitate the insertion of the second buckling portion 43 into the first buckling portion 48. The light-shielding hood 40 can be made as black, and the inside thereof is further sprayed with a matte paint, which may effectively prevent light from entering the inside of the light-shielding hood 40 and thus reflecting onto the display screen 39, which would otherwise affect the human eye's observation on images.

The second buckling portion 43 may be a buckling lug and have a substantially rectangular flat plate-shaped structure. Each of the upper hood body 41 and the side hood bodies 42 is provided with the second buckling portion 43 to improve the firmness for fixing the light-shielding hood 40 to the housing 27. The upper hood body 41 may be provided with two second bucking portions 43 that are close to two ends of the upper hood body 41 respectively. Each of the side hood bodies 42 is provided with one second buckling portion 43 that is close to the lower end of the side hood body 42 (wherein the lower end of the side hood body 42 is opposite to the upper end thereof). In this way, after the light-shielding hood 40 is deformed, it is convenient to buckle the second buckling portion 43 into the first buckling portion 48, and the firmness for securing the light-shielding hood 40 can be improved.

The second buckling portion 43 is perpendicular to a surface of the light-shielding hood 40 where the second buckling portion is located, i.e., the second buckling portion 43 of the upper hood body 41 is perpendicular to a surface of the upper hood body 41 where the second buckling portion is located and the second buckling portion 43 on the side hood body 42 is perpendicular to a surface of the side hood body 42 where the second buckling portion is located, so as to facilitate the buckling of the second buckling portion 43 into the first buckling portion 48. Of course, the "perpendicular to" here is not absolutely 90 degrees, but may be slightly larger than 90 degrees (for example, 93 degrees) or slightly smaller than 90 degrees (for example, 85 degrees). The orientation of each of the second buckling portions 43 may be the same, for example, toward the rear of the housing 27, to facilitate the mounting of the light-shielding hood 40.

When mounting the light-shielding hood 40, the two side hood bodies 42 of the light-shielding hood 40 are hold to apply opposite forces on the two side hood bodies 42 such that the two side hood bodies 42 are bent and deformed toward each other, and the upper hood body 41 is also bent and deformed to a certain extent. At this time, the second buckling portion 43 of the upper hood body 41 is buckled into the corresponding first buckling portion 48. Then, the forces applied on the side hood bodies 42 are removed and thus the deformation of the light-shielding hood 40 disappears, and the second buckling portions 43 of the side hood bodies 42 are also buckled into the corresponding first buckling portions 48, thereby completing the mounting of the light-shielding hood 40.

When detaching the light-shielding hood 40, the two side hood bodies 42 of the light-shielding hood 40 are hold to apply opposing forces on the two side hood bodies 42, so that the two side hood bodies 42 are bent and deformed toward each other. At this time, the second buckling portions 43 of the side hood bodies 2 are detached from the first buckling portions 48. Then, the second buckling portion 43 of the upper hood body 41 is detached from the first buckling portion 48 to remove the light-shielding hood 40.

Finally, it should be pointed out that the above embodiments are only used to describe the technical solutions of the embodiments of the present application, and are not limited thereto. Those skilled in the art should understand that the technical solutions described in the foregoing embodiments may be modified, or some of the technical features may be equivalently replaced, and these modifications or replacements do not make the corresponding technical solutions essentially deviate from the spirit and scope of the technical solutions of the embodiments of the present application.

The invention claimed is:

1. A handheld infrared imager, comprising a battery module; wherein the battery module comprises a cell (1) and a battery cover (7); a circumferential positioning hole (11) or a circumferential positioning protrusion is provided at an end of the cell (1) adjacent to the battery cover (7), a circumferential positioning protrusion (71) or a circumferential positioning hole is correspondingly provided at a bottom of the battery cover (7), and the circumferential positioning protrusion and the circumferential positioning hole are engaged with each other to achieve relative circumferential positioning between the cell (1) and the battery cover (7); and a longitudinal positioning protrusion (12) or a longitudinal positioning groove is provided on an outer peripheral sidewall of the cell (1), a longitudinal positioning groove (72) or a longitudinal positioning protrusion is correspondingly provided on a sidewall of the battery cover (7), and the longitudinal positioning protrusion and the longitudinal positioning groove are engaged with each other to achieve relative longitudinal positioning between the cell (1) and the battery cover (7).

2. The imager of claim 1, wherein, two circumferential positioning holes (11) are provided on the cell (1), each of the circumferential positioning holes (11) is of a cylindrical shape or a conical shape and the circumferential positioning protrusion (71) is of a cylindrical shape or a cone frustum shape.

3. The imager of claim 1, wherein, the sidewall of the battery cover (7) comprises an outer peripheral sidewall and an additional sidewall (75) provided inside and spaced from the outer peripheral sidewall; the additional sidewall (75) extends upward from the bottom of the battery cover (7), and the additional sidewall has a thickness smaller than a thickness of the outer peripheral sidewall; the longitudinal positioning groove (72) is provided in the additional sidewall (75) and penetrates the additional sidewall (75).

4. The imager of claim 3, wherein, two longitudinal positioning protrusions (12) are provided on the cell (10), and the two longitudinal positioning protrusions (12) are provided facing away from each other; the additional sidewall (75) extends along a partial circumference thereof and comprises a first additional sub-sidewall and a second additional sub-sidewall; the longitudinal positioning groove (72) is provided in a middle along a circumferential direction of each of the first additional sub-sidewall and the second additional sub-sidewall.

5. The imager of claim 1, wherein, the battery module further comprises a battery buckle (3) and an elastic sheet (2); one end of the battery buckle (3) is provided with a barb (32) that is cooperatively connected to a main body of a handheld device, the battery buckle (3) is provided with a rotating shaft (31) at a portion thereof away from the barb, and the rotating shaft (31) is rotatably engaged with the battery cover (7) to allow the battery buckle (3) to swing around the rotating shaft (31); one end of the elastic sheet (2) is inserted and mounted into the battery cover (7), and the other end of the elastic sheet (2) abuts against the battery buckle (3) and applies an outward elastic force on the battery buckle (3).

6. The imager of claim 5, wherein, two battery buckles (3) and two elastic sheets (2) are provided, with one set of a battery buckle (3) and an elastic sheet (2) and the other set of a battery buckle (3) and an elastic sheet (2) provided facing away from each other;
or wherein, the longitudinal positioning protrusions (12) provided on the cell (1) and the battery buckle (3) are staggered from each other in a circumferential direction;
or wherein, the rotating shaft (31) of the battery buckle (3) has a semicircular cross-section or an inferior arc cross-section, an arc-shaped straight groove (73) is provided in the battery cover (7), and the rotating shaft (31) is rotatably engaged inside the arc-shaped straight groove (73);
or wherein, the battery cover (7) is a two-color injection-molded part, which has a surface layer made of a soft rubber material and an inner layer made of hard plastic; the soft rubber of the surface layer of the battery cover (7) is provided with a protruding thin rib (79) at an end surface abutting against the main body of the device, and the thin rib (79) protrudes with a height less than or equal to 2 mm;
or wherein, the battery module further comprises a cover plate (5), which is fixedly connected to the battery cover (7) by a screw (4) and is engaged with the battery buckle (3) to limit longitudinal movement of the battery buckle (3) and limit circumferential rotation of the battery buckle.

7. The imager of claim 1, further comprising a trigger button assembly; wherein, the trigger button assembly comprises:
a trigger fixing base (6);
a trigger (8); and
a button structure, which is provided between the trigger fixing base (6) and the trigger (8) and can close or open a circuit when pressed by the trigger (8); and
wherein, the trigger button assembly further comprises a rotating connection (10), via which one end of the trigger (8) is connected to the trigger fixing base (6).

8. The imager of claim 7, wherein, the rotating connection (10) comprises a rotating shaft, which passes through aligned mounting holes in the trigger fixing base (6) and the trigger (8).

9. The imager of claim 7, further comprising a restoration member; wherein, the restoration member is provided between the trigger fixing base (6) and the trigger (8), and provides an elastic force for the trigger (8) to return and maintain in an initial position after the trigger is pressed, and a gap is provided between the button structure and the trigger (8) in the initial position.

10. The imager of claim 9, wherein, the restoration member comprises a torsion spring (15), which is sleeved outside the rotating shaft, and torsion arms (36) at both ends of which abut against the trigger fixing base (6) and the trigger (8) respectively.

11. The imager of claim 7, wherein, the button structure is a button PCB board (9), the trigger button assembly further comprises a PCB board sealing pad (16) that is adhered to one side of the button PCB board by a sealant.

12. The imager of claim 11, wherein, the PCB board sealing pad (16) is made of a rubber material and comprises a block (61); one side of the block (61) is adhered by the sealant to a first side (25), where a switch contact portion is located, of the button PCB board (9), and the other side of the block (61) is provided with a pressing protrusion (62), which can apply a force on the switch contact portion (34) of the button PCB board (9) when the pressing protrusion is pressed by the trigger (8).

13. The imager of claim 12, wherein, the button PCB board is provided with a mounting through hole (24); a mounting post (63) is provided at a side, to which the first side (25) of the button PCB board (9) is adhered, of the block (61); a flange (64) having a diameter larger than a diameter of the mounting through hole (24) is provided on an outer sidewall of the mounting post (63); the flange (64) passes through the mounting through hole (24) from the first side (25) of the button PCB board (9) and is pressed tightly against a second side (26) of the button PCB board (9) different from the first side (25).

14. The imager of claim 13, wherein, the flange (64) comprises a gradually-varied section (a), whose outer diameter gradually increases from outside to inside with respect to the block (61).

15. The imager of claim 7, further comprising a body (17); wherein, the trigger fixing base (6) of the trigger button assembly is fixedly connected to the body (17) by a bolt member (19), and a gasket (18) is provided between the trigger fixing base (6) and the body (17).

16. The imager of claim 1, further comprising:
a housing (27) provided with an electronic component (38) inside the housing and a first buckling portion (48) outside the housing;
a display screen (39) provided on the housing (27) and electrically connected to the electronic component (38); and
a light-shielding hood (40) provided with a second buckling portion (43) and detachably provided outside the housing (27) by means of the first buckling portion (48) and the second buckling portion (43) so as to shield light for the display screen.

17. The imager of claim 16, wherein, the light-shielding hood (40) comprises an upper hood body (41) provided above the display screen (39), and side hood bodies (42) with upper ends thereof connected to the upper hood body (41) and located at sides of the display screen (39); wherein, each of the upper hood body (41) and the side hood bodies (42) is provided with the second buckling portion (43).

18. The imager of claim 17, wherein, the upper hood body (41) is provided with two second buckling portions (43) that are close to two ends of the upper hood body (41) respectively.

19. The imager of claim 17, wherein, each of the side hood bodies (42) is provided with one second buckling portion (43) that is close to a lower end of the side hood body;
or wherein, the second buckling portion (43) is perpendicular to a surface of the light-shielding hood (40) where the second buckling portion is located;
or wherein, a protruding edge (47) is provided at a side of the body having the display screen (39); wherein, the protruding edge (47) is provided around an outer periphery of the housing (27), and the first buckling portion (48) is a buckling groove provided in the protruding edge (47);
or wherein, the light-shielding hood (40) is made of a material capable of deforming when subjected to a force;
or wherein, the housing (27) comprises a front housing part (45) and a rear housing part (46) that is buckled to the front housing part (45) through a protruding rib and a groove; wherein, the display screen (39) and the light-shielding hood (40) are both provided on the rear housing part (46).

20. The imager of claim 19, wherein, a seal connected to the protruding edge (47) and the housing (27) is provided in the buckling groove.

* * * * *